US012498632B2

(12) United States Patent
Liu et al.

(10) Patent No.: US 12,498,632 B2
(45) Date of Patent: Dec. 16, 2025

(54) AMBIENT IMAGE PROJECTION DEVICE

(71) Applicant: ZHONGSHAN BO LONG ELECTRONIC TECHNOLOGY CO., LTD., Zhongshan (CN)

(72) Inventors: Kexian Liu, Zhongshan (CN); Yong Huang, Zhongshan (CN); Gang Wang, Zhongshan (CN)

(73) Assignee: ZHONGSHAN BO LONG ELECTRONIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/562,333

(22) PCT Filed: Jun. 11, 2022

(86) PCT No.: PCT/CN2022/098282
§ 371 (c)(1),
(2) Date: Nov. 20, 2023

(87) PCT Pub. No.: WO2023/137951
PCT Pub. Date: Jul. 27, 2023

(65) Prior Publication Data
US 2024/0248386 A1   Jul. 25, 2024

(30) Foreign Application Priority Data

Jan. 19, 2022  (CN) .......................... 202210061417.3

(51) Int. Cl.
*G03B 21/26* (2006.01)
*G03B 21/00* (2006.01)
(Continued)

(52) U.S. Cl.
CPC ........... *G03B 21/26* (2013.01); *G03B 21/006* (2013.01); *G03B 21/142* (2013.01); *G03B 21/2066* (2013.01); *G03B 31/00* (2013.01)

(58) Field of Classification Search
None
See application file for complete search history.

(56) References Cited

U.S. PATENT DOCUMENTS

| 8,057,045 B2 | 11/2011 | Johnson et al. |
| 2007/0024820 A1* | 2/2007 | Chung ................ G03B 21/145 353/70 |

FOREIGN PATENT DOCUMENTS

| CN | 203407629 U | 1/2014 |
| CN | 207796894 U | 8/2018 |

(Continued)

OTHER PUBLICATIONS

Notification to Grant Patent, European Application No. 22921382.2, mailed Jun. 13, 2025 (3 pages).

*Primary Examiner* — Bao-Luan Q Le
*Assistant Examiner* — Danell L Owens
(74) *Attorney, Agent, or Firm* — HOWARD M COHN and Associates, LLC

(57) ABSTRACT

An ambient image projection device includes a light source assembly, a first projection mechanism and a second projection mechanism provided side by side; the first projection mechanism includes a display and a first optical module, a content played on the display is guided by the first optical module to form a dynamic image to be projected in space; the second projection mechanism includes an interference lens and a second optical module, light emitted from the light source assembly is guided by the second optical module to pass through the interference lens and forms an interference pattern to be projected in space; the interference pattern and the dynamic image overlap at least partially with each other in the space. The device provides more stereoscopic dynamic visual experience by projecting images via a display.

18 Claims, 5 Drawing Sheets

(51) Int. Cl.
*G03B 21/14* (2006.01)
*G03B 21/20* (2006.01)
*G03B 31/00* (2021.01)

(56) References Cited

FOREIGN PATENT DOCUMENTS

| | | | | |
|---|---|---|---|---|
| CN | 108692237 A | * | 10/2018 | ................ F21S 8/04 |
| CN | 210891354 U | | 6/2020 | |
| CN | 212675350 U | * | 3/2021 | |
| CN | 112728465 A | * | 4/2021 | ............. G09B 27/04 |
| CN | 213118555 U | | 5/2021 | |
| CN | 113759651 A | | 12/2021 | |
| CN | 114185239 A | | 3/2022 | |
| JP | 2006317708 A | | 11/2006 | |
| JP | 2011187172 A | * | 9/2011 | |

* cited by examiner

AMBIENT IMAGE PROJECTION DEVICE

CROSS REFERENCE TO THE RELATED APPLICATIONS

This application is the national phase entry of International Application No. PCT/CN2022/098282, filed on Jun. 11, 2022, which is based upon and claims priority to Chinese Patent Application No. 202210061417.3, filed on Jan. 19, 2022, the entire contents of which are incorporated herein by reference.

FIELD OF THE INVENTION

The present disclosure relates to the technical field of a projection lamp, and in particular to an ambient image projection device and an ambient image projection method.

BACKGROUND

Ambient lamp is a type of lamp which can project patterns on a wall, a floor, or a curtain. Ambient lamp is commonly applied in theaters, studios, bars, discos and other stage entertainment scenes, and can project patterns of a single-color or multi-color, water wave, star sky or various lines, creating a warm and romantic immersive scene.

With continuous progress and development of society, people's living standards have been continuously improved, and ambient lamp has gradually entered thousands of households. Ambient lamp in the prior art usually realizes projection of patterns by transmitting light through a decorative cover printed with pattern. In order to improve the projection effect, ambient lamp in the prior art is sometimes equipped with one or more water-ripple patterned sheet rotatable relative to the light source, such that light is first incident to a condenser lens and is then projected to image, thereby producing a variety of effects such as flow of star river, water ripples, etc.

For example, U.S. Pat. No. 8,057,045B2 discloses a projection method and device employing a motor-driven interference wheel to realize dynamic starry sky and cloud changing effects. Chinese utility model patent No. CN 207796894U discloses a water-ripple projection lamp which achieves water-ripple projection effect by multiple focusing with water-ripple glass shading cloth and the repeated movement of a shaft. Chinese utility model patent No. CN 210891354U discloses a three-in-one star lamp, which realizes a projection effect of changing star, moon and sea of clouds by means of a water-ripple sheet and a projection device.

In the prior art, motor and interference sheet cooperate with each other to achieve dynamic projection effects. However, the projection image changes periodically, and long-term viewing thereto may cause aesthetic fatigue. For this reason, a set of static picture projection may be superimposed on an interference image serving as dynamic background, to form a more stereoscopic visual effect. However, this kind of ambient lamp is usually embodied in form of slideshow which often requires manual switching of pictures, and the switching manner is cumbersome. Further, the pictures are usually projected films, and the more films are projected, the more options there are for the scene, and the greater the costs.

SUMMARY OF THE INVENTION

To solve or at least partially solve the technical problems mentioned above, the present disclosure provides an ambient image projection device which includes a light source assembly, a first projection mechanism and a second projection mechanism provided side by side. The first projection mechanism includes a display and a first optical module; a content played on the display is guided by the first optical module to form a dynamic image to be projected in space. The second projection mechanism includes an interference lens and a second optical module; light emitted from the light source assembly is guided by second optical module to pass through the interference lens and forms an interference pattern to be projected in space. Here, the interference pattern and the dynamic image overlap at least partially with each other in the space.

Compared with the ambient image projection device in the prior art, the present disclosure projects images through a display without setting up film(s), which is less costly, and the display is able to provide more abundant and diverse image selections, and switching of images is natural and easy to operate, thus significantly improving the user experience.

BRIEF DESCRIPTION OF THE DRAWINGS

In order to more clearly illustrate embodiments of the present disclosure, a brief description of relevant accompanying drawings will be given below. It is noted that the accompanying drawings in the following description are used only to illustrate certain embodiments of the present disclosure, and many other technical features and connection relationships not mentioned herein may be obtained by those of ordinary skill in the art based on these accompanying drawings.

Figure 1:
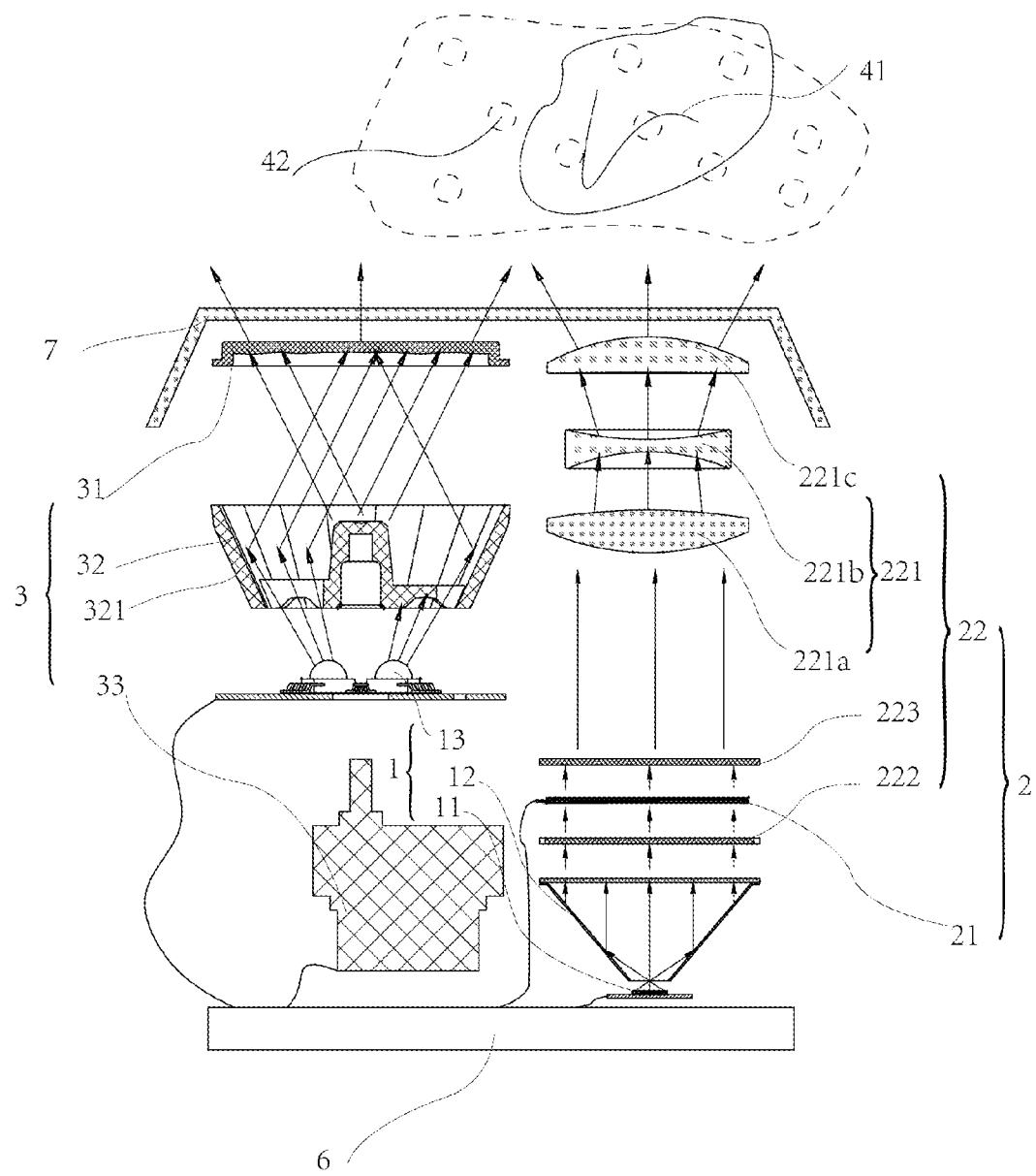
FIG. 1 is a schematic structural view of an ambient image projection device according to one embodiment of the present disclosure.

Reference signs in the drawings 1. light source assembly; 11. first light source; 12. focusing element; 121. light inlet; 122. light outlet; 13. second light source; 2. first projection mechanism; 21. display; 22, first optical module; 221. optical lens; 221a. convex lens; 221b. concave lens; 221c. fisheye lens; 222. first lens; 223. second lens; 224. mirror; 3. second projection mechanism; 31. interference lens; 32. second optical module; 321. reflector; 33. motor; 41. dynamic image; 42, interference pattern; 5. speaker; 6. controller; 7. dustproof light-transmitting cover.

DETAILED DESCRIPTION OF THE EMBODIMENTS

Technical solutions in the embodiments of the present disclosure are described in detail below in conjunction with accompanying drawings in the present disclosure.

Inventors of the present disclosure have found that in the prior art, motor is used to drive rotation of a light-transmitting structure, thus realizing change in movement of images created by a projection. However, the projected image changes periodically and may cause aesthetic fatigue for long-term viewing, and the method of switching the projected image is rigid, which makes it difficult to present a relatively shocking scene.

In view of this, an ambient image projection device is provided in the present disclosure, which can present a more realistic and diverse dynamic scene, in order to improve the user experience.

Embodiment I

Referring to FIG. 1, the first embodiment of the present disclosure proposes an ambient image projection device, which includes a light source assembly 1, and a first projection mechanism 2 and a second projection mechanism 3 provided side by side.

The first projection mechanism 2 includes a display 21 and a first optical module 22. A content played on the display 21 is guided by the first optical module 22 to form a dynamic image 41 to be projected in space.

The second projection mechanism 3 includes an interference lens 31 as well as a second optical module 32. Light emitted from the light source assembly 1 is guided by the second optical module 32 to pass through the interference lens 31, and forms an interference pattern 42 to be projected in space.

The interference pattern 42 and the dynamic image 41 overlap at least partially with each other in the space.

Content played on the display 21 can form a dynamic image 41 and be projected in space, and the light emitted from the light source assembly 1 can pass through the interference lens 31 to form an interference pattern 42 to be projected in space, where the interference pattern 42 (marked by dashed line in FIG. 1) and the dynamic image 41 overlap at least partially with each other in the space, and the coverage area of the interference pattern is large, thus providing more extensive dynamic visual experience. By projecting images through a display 21, there is no need to set up film(s), which is less costly, and the display 21 can provide more abundant and diverse image choices, while the switching of images is natural and easy to operate. Compared with the prior art, a combination of the interference pattern 42 and the dynamic image 41 in this embodiment not only compensates the deficiency of narrow visual range of dynamic image 41, but also avoids the deficiency of monotonous feeling due to little variation of interference pattern 41, and a complementary combination of the two substantially improves the user experience.

In this embodiment, the display 21 can be a liquid crystal display with merits of low power consumption, small size, and zero radiation, etc. The light emitted from the light source assembly 1 can be irradiated onto the display 21 as backlight. In another embodiment, the display 21 may be a display capable of self-illumination, such as an LED display or an OLED display, as long as the display 21 is capable of presenting content to be dynamically displayed.

The first optical module 22 may include an optical lens 221 and several lenses. The light source assembly 1 includes a first light source 11 and a focusing element 12. The first light source 11, the focusing element 12, the display 21 and the optical lens 221 are disposed in order along a light path followed by the first optical module 22, and each lens is interposed between respective components of the first optical module 22. A combined use of the optical lens 221, the lenses, and the focusing element 12 allows for a clearer projected dynamic image 41 and a better light output efficiency.

In order to improve the imaging clarity, the lens can be a convex lens converging light. However, if a common convex lens were used, refraction of light would occur only at an intersection of the medium, and since the convex lens is thick, light would be attenuated in propagation, so the phenomenon of darkening and blurring at corners might occur. Therefore, the lens in this embodiment may adopt a Fresnel lens. Fresnel lens has a smooth surface on one side, and the other side is engraved with concentric circles from small to large, the texture of which is designed according to requirements for interference and diffraction of light, as well as relative sensitivity and reception angle. Hence in the Fresnel lens, a part involving linear propagation can be removed, and only a curved surface where refraction occurs is kept, which can save a quantity of material while achieving the same focusing effect as a convex lens. In other words, the costs of Fresnel lens is much lower than that of an ordinary convex lens.

The lenses may include a first lens 222 provided between the focusing element 12 and the display 21, and a second lens 223 provided between the display 21 and the optical lens 221. The optical lens 221 may include a convex lens 221$a$, a concave lens 221$b$ and a fisheye lens 221$c$ disposed in sequence, with the convex lens 221$a$ being set on the side near the display 21.

The first lens 222 and the second lens 223 as provided can better converge light and prevent the waste of light energy. The convex lens 221$a$ can converge light, while the concave lens 221$b$ can disperse light. Hence, designing parameters of the convex lens 221$a$ and concave lens 221$b$ can better ensure the projection effect of image, such as the size of imaging and image distance, the focusing range, and the imaging quality. The fisheye lens 221$c$, as a wide-angle lens, enables the lenses to reach a maximum photographic angle of view, such that a larger space can be projected in such a small space by the ambient image projection device, thereby improving space utilization of the ambient image projection device.

Figure 2:
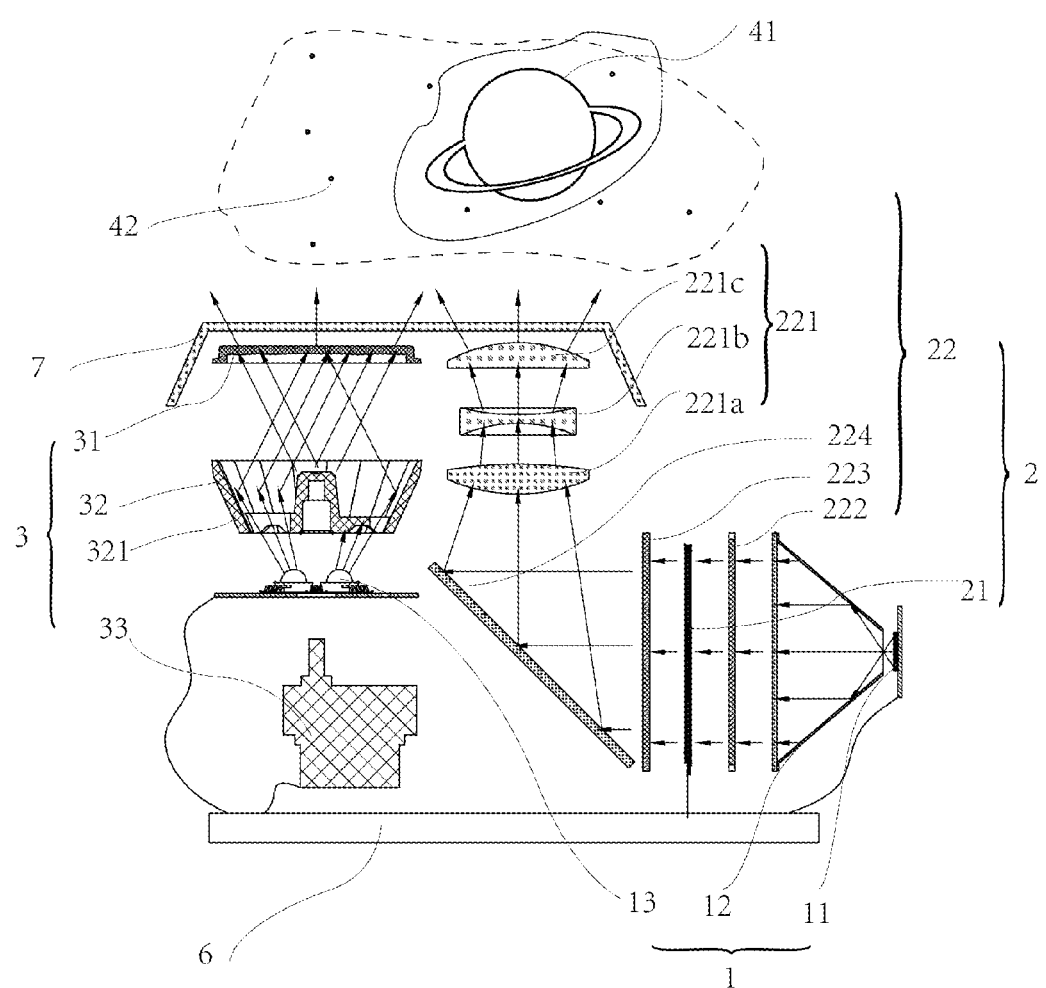
FIG. 2 is a schematic structural view of an ambient image projection device according to another embodiment of the present disclosure.

In another embodiment referring to FIG. 2, the first optical module 22 may also include a mirror 224 provided between the second lens 223 and the optical lens 221, and the mirror 224 is angled with the display 21. Where the mirror 224 is set at an angle to the display 21, the direction of light propagation can be changed, so that light emitted from the second lens 223 is reflected by the mirror 224 and incident on the optical lens 221. Optionally, the mirror 224 and the display 21 are set at an angle of 45°, such that the light emitted from the second lens 223 and the light incident on the optical lens 221 are perpendicular to each other.

Comparing FIG. 1 with FIG. 2, it can be seen that the size of components such as optical lens 221 in the embodiment shown in FIG. 2 can be relatively smaller, when the size of the lenses and mirror 224 are the same. Similarly, the size of the lenses and mirror 224 can be smaller when the size of components such as the optical lens 221 is the same. That is to say, space utilization of the ambient image projection device can be further improved in this embodiment due to use of the mirror 224.

The second optical module 32 may include a reflector 321 provided between the light source assembly 1 and the interference lens 31. Reflective surfaces on the inner wall of the reflector 321 consists of a plurality of planes capable of reflecting light, and the light incident on the reflective surfaces can be reflected out from the plurality of planes to create numerous interlaced rays, so that the reflector 321 can guide light emitted from the light source assembly 1 to the interference lens 31, thus making the projected interference pattern 42 clearer, and leading to better light output efficiency.

It is apparent to those of ordinary skill in the art that in physics, "interference" refers to a phenomenon where two or more columns of waves superimpose or cancel with each other when meeting in space, so as to form a new waveform. For example, if a beam splitter were used to split a monochromatic beam into two beams, and the two beams were then allowed to overlap in a certain region in the space, it would be found that the light intensity in the overlapping region is not uniformly distributed, the brightness would vary with its position in space, for example, the light intensity in the brightest place might exceed a sum of light intensities of two original beams, and the light intensity in the darkest place might be zero. Such redistribution of light intensity is referred to as "interference fringes".

The interference lens 31 can be of a sheet structure with light transmission and refraction functions having a water patterned disk, and its material can be glass, resin, PC, etc., the specific choice of which does not limit the present application. Since the surface of the interference lens 31 is uneven, optical path difference of the refracted light varies, and the coherent light is superimposed on each other such that alternating light and dark interference stripes appear.

In this embodiment, the interference lens 31 or the reflector 321 can rotate 360° under the driving of motor 33, to project a dynamic interference pattern 42 in space, thus realizing effects such as flowing of star river and rippling of water waves, which improves the user experience. For instance, the motor 33 can drive interference lens 31 to rotate while the reflector 321 remains stationary; alternatively, the motor 33 can drive reflector 321 to rotate while the interference lens 31 remains stationary.

The light source assembly 1 may further include multiple second light sources 13 corresponding to the reflector 321, and the light emitted from different second light sources 13 passes through the interference lens 31 to produce different interference patterns 42. Respective second light source 13 can be turned on and off sequentially to project dynamic interference patterns 42 in space. The second light source 13 with different colors and light intensities can make the projected interference patterns 42 more variations, thereby improving projection effect of the ambient image projection device.

Notably, the second light source 13 employed in the present disclosure can be a monochromatic light source or an RGB light source, i.e., a multi-color light source. The first light source 11 applied in the present disclosure is preferred to be white light, which, compared to light sources of other colors, does not affect the warm and cold of image colors when projected onto the display 21, and therefore can present the image colors more realistically.

Figure 3:
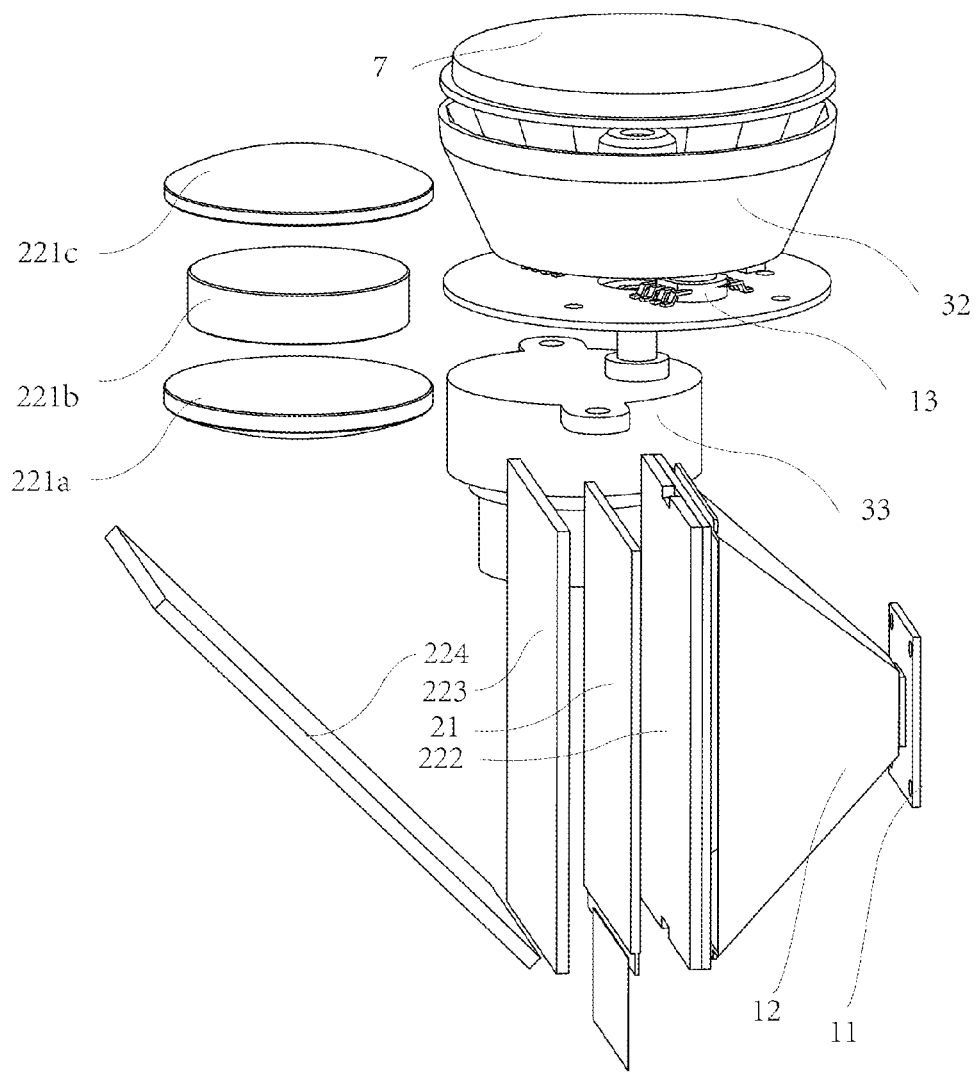
FIG. 3 is an exploded schematic view of an ambient image projection device according to one embodiment of the present disclosure.

In this embodiment shown in FIGS. 2-3, light emitted from the monochromatic or multi-color second light source 13 is reflected by the reflector 321. The reflector 321 can be fixed to the motor 33 via three reinforcing bars, so that the reflected light also rotate along with the motor 33, and projects patterns onto the interference lens 31 with stripes or uneven surfaces.

Light emitted from the first light source 11 is collected by the focusing element 12 and projected onto the first lens 222, and is then transmitted to the liquid crystal display 21 as backlight. The content on the display 21 can be converted to 3D for the first time through the second lens 223, and then projected onto the convex lens 221a and concave lens 221b for a second conversion, and finally passes through the fisheye lens 221c for imaging.

The images projected by the second projection mechanism 3 and first projection mechanism 2 are then refracted via an irregular dustproof light-transmitting cover 7, and eventually form a dynamic image 41 and an interference pattern 42 respectively, which are projected in space. For example, the interference pattern 42 is presented as rotating night sky, and the dynamic image 41 can be rotating Saturn. The interference pattern 42 overlaps at least partially with the dynamic image 41 in space, such that the final projection in space is a dynamic image with Saturn as foreground and night sky as background. Therefore, this embodiment can provide an ambient image projection device with wide-angle view and a stereoscopic effect, which involves smooth image playback, various imaging selections, a compact structure and low costs, and can also significantly improves the user experience.

Notably, the first projection mechanism 2 and second projection mechanism 3 of the ambient image projection device in this embodiment can be used independently or in conjunction with each other, according to user's needs.

Embodiment II

The second embodiment of the present disclosure proposes an ambient image projection device, which differs from the first embodiment mainly in that in the first embodiment, the first projection mechanism 2 and the second projection mechanism 3 are connected to different light sources, whereas in the second embodiment, the first projection mechanism 2 and the second projection mechanism 3 are connected to the same light source.

Figure 4:
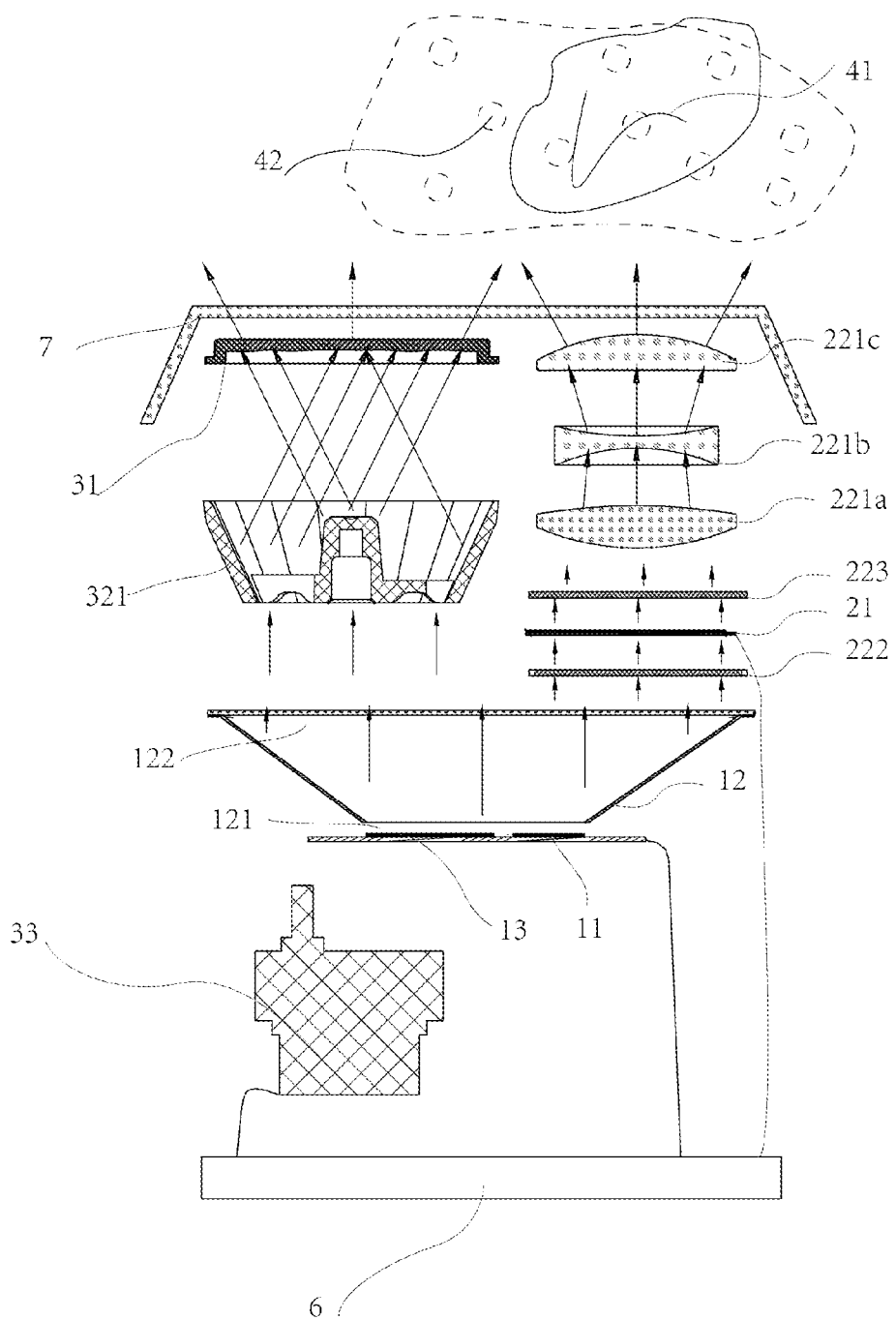
FIG. 4 is a schematic structural view of an ambient image projection device according to yet another embodiment of the present disclosure.

Specifically referring to FIG. 4, the focusing element 12 includes a light inlet 121 and a light outlet 122, and both the display 21 and the reflector 321 are located at the outlet of the focusing element 12.

Light emitted from the first light source 11 and the second light source 13 is irradiated to the focusing element 12 through the light inlet 121.

After the light emitted from the first light source 11 and second light source 13 is collected by the focusing element 12, a portion of the light is reflected by the reflector 321 and pattern is projected onto the interference lens 31 with strips or uneven surface; the remaining portion is projected onto the first lens 222 and transmitted to the liquid crystal display 21 as backlight. The content on the display 21 can be converted to 3D for the first time through the second lens 223, and is then projected onto the convex lens 221a and concave lens 221b for a second conversion, and finally passes through the fisheye lens 221c for imaging. In one embodiment, the first light source 11 and the second light source 13 may be mounted on a motor 33 and rotate under the driving of the motor 33. The first light source 11 and the second light source 13 may also be the same light source, providing both the light incident to the reflector 321 and the light incident to the display 21.

Images projected by the second projection mechanism 3 and the first projection mechanism 2 are then refracted by the irregular dustproof light-transmitting cover 7, and eventually form an interference pattern 42 and a dynamic image 41 respectively which are projected in space. Compared with the first embodiment, the ambient image projection device in this embodiment involves a more compact structure, higher space utilization and cost saving.

Embodiment III

Figure 5:
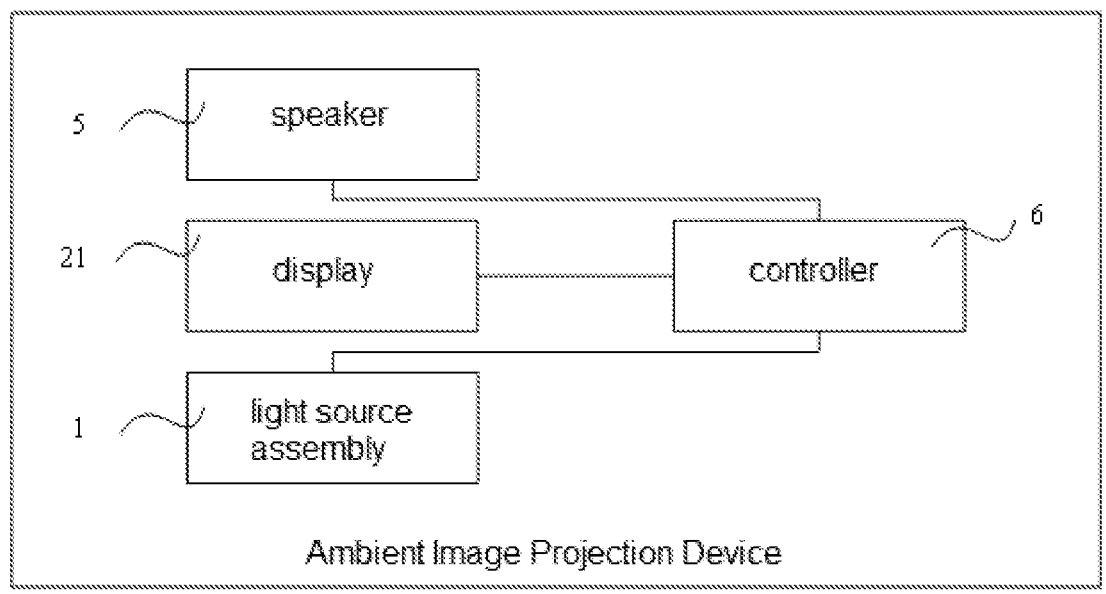
FIG. 5 is a structural block diagram of an ambient image projection device according to a further embodiment of the present disclosure.

In order to bring an immersive experience to the user, inventors of the present disclosure have optimized design based on the above embodiments to further enhance the projection effect of the ambient image projection device. Referring to FIG. 5, the ambient image projection device may include a speaker 5 and a controller 6. The controller 6 is communicably coupled to all of the display 21, the speaker 5 and the light source assembly 1 respectively, and is configured to provide a video signal to the display 21 and an audio signal to the speaker 5. The controller 6 is further configured to adjust intensity or frequency of light incident to the second projection mechanism 3 from the light source assembly 1 according to waveform of the audio signal, etc. This embodiment enables the controller 6 to make light intensity of the interference pattern 42 and the dynamic image 41 change with music, providing the user with both visual and auditory enjoyment and improving the fun. For example, when the music is light, the second light source 13 can be dimmed accordingly; when the music is louder, the second light source 13 can be brightened accordingly. Alternatively, when the music is slower, the second light source 13 can flash at a lower frequency; when the music is faster, the second light source 13 can flash at a higher frequency.

In an embodiment referring to FIG. 5, the controller 6 may be further configured to adjust color of light incident to the second projection mechanism 3 from the light source assembly 1, according to RGB color of the video signal. The display 21 can present a variety of colors, and the color of light incident to the second projection mechanism 3 from the light source assembly 1 can be adjusted by analyzing its main color. For example, if the main color presented by the display 21 is blue, the second light source 13 may be white or yellow or the like, so as to improve contrast ratio of the overall projection effect. It is understood that the greater the contrast ratio is, the clearer and more eye-catching the image is, and the more vivid and colorful it is, which facilitates improvement of the user experience.

In this embodiment, the controller 6 can be a microcontroller chip integrated in a control circuit board of the light source assembly 1, or it can be set up individually. The controller 6 can receive control signals through a button switch, or a mechanism such as a wireless signal transceiver, to control the intensity of light in the second projection mechanism 3. Further, the control circuit board can be DC driven to power the light source assembly 1.

Embodiment IV

The present disclosure further proposes an ambient image projection method, which includes the steps of:
  forming a dynamic image 41 of the content played on the display 21 under the guidance of the first optical module 22, and projecting it in space;
  passing light emitted from the light source assembly 1, under the guidance of the second optical module 32, through the interference lens 31 to form an interference pattern 42, and projecting it in space;
  wherein the interference pattern 42 and the dynamic image 41 overlap at least partially with each other in the space.

The content played on the display 21 can generate a dynamic image 41 to be projected in space, the light emitted by the light source assembly 1 can pass through the interference lens 31 to form an interference pattern 42 to be projected in space, and the interference pattern 42 and the dynamic image 41 overlap at least partially with each other in the space, therefore a more stereoscopic visual experience can be expected. Compared with the prior art, this embodiment projects images through the display 21 without need for setting up film(s), which is less expensive, and the display 21 can provide richer and more diverse image selections, the switching of images is natural and easy to operate, which can significantly improve the user experience.

In this embodiment, the ambient image projection method may further include the steps of:
  providing a video signal to the display 21 and an audio signal to the speaker 5;
  adjusting intensity or frequency of light incident to the second optical module 32 from the light source assembly 1, according to waveform of the audio signal; and
  adjusting color of light incident to the second optical module 32 from the light source assembly 1, according to RGB color of the video signal.

The light intensity or luminous frequency of the interference pattern 42 and the dynamic image 41 changes with music, providing the user with a visual and auditory enjoyment and improving the fun. This embodiment is able to improve the contrast ratio between foreground and background of the overall projection effect, by means of analyzing a main color of the display 21 to adjust the color of the light incident to the second projection mechanism 3 from the light source assembly 1. Understandably, the greater the contrast ratio, the clearer and the more eye-catching the dynamic image 41 in the foreground is, and the more vivid and colorful it is, thereby providing a more impactful visual effect.

It is apparent to those skilled in the art that the present disclosure is not limited to the details of the exemplary embodiment described above, and can be realized in other specific forms without departing from the spirit or essential features of the present disclosure. Thus, the embodiments of the present disclosure shall be taken as exemplary and non-limiting from any perspective. The scope of the present disclosure is limited by the appended claims and not by the above description, and is intended to encompass all variations falling within the spirit and scope of the equivalent elements of the claims. Also, any appended marking in the claims shall not be considered as limiting the claims involved.

What is claimed is:

1. An ambient image projection device, comprising:
  a light source assembly; and
  a first projection mechanism and a second projection mechanism provided side by side; wherein the second projection mechanism comprises an interference lens and a second optical module; light emitted from the light source assembly is guided by the second optical module to pass through the interference lens and forms an interference pattern to be projected in space;
  wherein the first projection mechanism comprises a display and a first optical module; a content played on the display is guided by the first optical module to form a dynamic image to be projected in space;
  wherein the interference pattern and the dynamic image overlap at least partially with each other in the space;
  the second optical module comprises a reflector provided between the light source assembly and the interference lens for directing light emitted from the light source assembly to the interference lens, wherein reflective surfaces on an inner wall of the reflector consists of a plurality of planes capable of reflecting light, such that light incident on the reflective surfaces is reflected out from the plurality of planes to create numerous interlaced rays;

wherein the light source assembly comprises a first light source and a focusing element; the first optical module comprises an optical lens and a plurality of lenses; the first light source, the focusing element, the display and the optical lens are disposed in order along a light path followed by the first optical module;

wherein the focusing element comprises a light inlet and a light outlet, the display and the reflector are located at the light outlet;

the light emitted from the light source assembly is all incident to the focusing element through the light inlet.

2. The ambient image projection device according to claim 1, wherein the display is a liquid crystal display, and the light emitted from the light source assembly is incident to the liquid crystal display to serve as a backlight.

3. The ambient image projection device according to claim 1, wherein the lenses comprises a first lens provided between the focusing element and the display, and a second lens provided between the display and the optical lens; the optical lens comprises a convex lens, a concave lens and a fisheye lens disposed in sequence, wherein the convex lens is set on a side close to the display.

4. The ambient image projection device according to claim 3, wherein the first optical module further comprises a mirror provided between the second lens and the optical lens, and the mirror is angled with the display.

5. The ambient image projection device according to claim 1, wherein the interference lens or the reflector is allowed to rotate under driving of a motor, to project a dynamic interference pattern in space; or the light source assembly comprises multiple second light sources corresponding to the reflector, wherein light emitted from different second light sources passes through the interference lens to produce different interference patterns, the second light sources are sequentially turned on and off to project the dynamic interference pattern in space.

6. The ambient image projection device according to claim 1, further comprising a speaker and a controller, wherein the controller is communicably coupled to the display, the speaker and the light source assembly respectively, wherein the controller is configured to provide a video signal to the display and an audio signal to the speaker, and is further configured to adjust intensity or frequency of light incident to the second projection mechanism from the light source assembly according to waveform of the audio signal.

7. The ambient image projection device according to claim 1, further comprising a controller communicably coupled to each of the display and the light source assembly, wherein the controller is configured to provide a video signal to the display, and is further configured to adjust color of light incident to the second projection mechanism from the light source assembly according to RGB color of the video signal.

8. An ambient image projection device, comprising:
a light source assembly; and
a first projection mechanism; wherein the first projection mechanism comprises a display and a first optical module comprising a plurality of lenses; a content played on the display is guided by the first optical module to form an image to be projected in space;

wherein the light source assembly comprises a first light source and a focusing element; the focusing element comprises a light inlet and a light outlet, the display is located at the light outlet and parallel with the light outlet;

the light emitted from the light source assembly is incident to the focusing element through the light inlet;

wherein the plurality of lenses comprises a first lens, a second lens and a third lens, at least the first lens and the second lens are parallel with the light outlet of the focusing element, the first lens is provided between the focusing element and the display, and the second lens is provided between the display and the third lens.

9. The ambient image projection device according to claim 8, further comprising a controller communicably coupled to each of the display and the light source assembly, wherein the controller is configured to provide a video signal to the display.

10. The ambient image projection device according to claim 8, wherein the third lens is a lens module comprising a convex lens, a concave lens and a fisheye lens disposed in sequence, wherein the convex lens is set on a side close to the display.

11. The ambient image projection device according to claim 8, further comprising a controller, wherein the controller is able to receive control signals through a wireless signal transceive.

12. The ambient image projection device according to claim 8, further comprising a control circuit board, wherein the control circuit board is DC driven to power the light source assembly.

13. An ambient image projection device, comprising:
a light source assembly; and
a first projection mechanism and a second projection mechanism provided side by side; wherein the second projection mechanism comprises an interference lens and a second optical module; light emitted from the light source assembly is guided by the second optical module to pass through the interference lens and forms an interference pattern to be projected in space;

wherein the first projection mechanism comprises a display and a first optical module; a content played on the display is guided by the first optical module to form a dynamic image to be projected in space;

wherein the interference pattern and the dynamic image overlap at least partially with each other in the space;

wherein the light source assembly comprises a first light source and a focusing element; the first optical module comprises a lens module and a plurality of lenses; the first light source, the focusing element, the display and the lens module are disposed in order along a light path followed by the first optical module, and the plurality of lenses are separately arranged in the light path;

wherein the focusing element comprises a light inlet and a light outlet, the display is located at the light outlet and parallel with the light outlet;

the light emitted from the light source assembly is all incident to the focusing element through the light inlet.

14. The ambient image projection device according to claim 13, wherein the interference lens is allowed to rotate 360° under driving of a motor, to project a dynamic interference pattern in space.

15. The ambient image projection device according to claim 13, further comprising a controller communicably coupled to each of the display and the light source assembly, wherein the controller is configured to provide a video signal to the display, and is further configured to adjust color of light incident to the second projection mechanism from the light source assembly according to RGB color of the video signal.

16. The ambient image projection device according to claim 13, wherein the plurality of lenses comprise a first lens provided between the focusing element and the display, and a second lens provided between the display and the optical lens; the lens module comprises a convex lens, a concave lens and a fisheye lens disposed in sequence, wherein the convex lens is set on a side close to the display.

17. The ambient image projection device according to claim 13, further comprising a controller, wherein the controller is able to receive control signals through a wireless signal transceive.

18. The ambient image projection device according to claim 13, further comprising a control circuit board, wherein the control circuit board is DC driven to power the light source assembly.

* * * * *